United States Patent [19]
Kane et al.

[11] Patent Number: 5,805,404
[45] Date of Patent: *Sep. 8, 1998

[54] COMMON INSULATING HOUSING FOR ELEMENTS OF VARYING TERMINALS

[75] Inventors: Adam Stuart Kane, Morristown, N.J.; Mark Steven Curtis, Papillion, Nebr.; Thomas Michael Hamilton, Council Bluffs, Iowa

[73] Assignee: Lucent Technologies Inc., Murray Hill, N.J.

[*] Notice: The term of this patent shall not extend beyond the expiration date of Pat. No. 5,643,014.

[21] Appl. No.: 442,902

[22] Filed: May 17, 1995

[51] Int. Cl.$^6$ ...................................................... H02H 1/00
[52] U.S. Cl. ............................................................. 361/111
[58] Field of Search ............................... 361/111, 90–92, 361/823, 824, 119

[56] References Cited

U.S. PATENT DOCUMENTS

| | | |
|---|---|---|
| 3,798,587 | 3/1974 | Ellis, Jr. et al. . |
| 4,171,857 | 10/1979 | Forberg et al. . |
| 4,283,103 | 8/1981 | Forberg et al. . |
| 4,580,864 | 4/1986 | Knickerbocker ............................ 339/98 |
| 4,655,521 | 4/1987 | Thomas .................................. 339/31 R |
| 4,741,711 | 5/1988 | Singer, Jr. ................................ 361/119 |
| 4,759,057 | 7/1988 | De Luca et al. ......................... 379/327 |
| 5,055,067 | 10/1991 | Field ......................................... 439/540 |
| 5,091,826 | 2/1992 | Arnett et al. ............................... 439/76 |
| 5,273,449 | 12/1993 | Mattis et al. ............................. 439/201 |
| 5,546,267 | 8/1996 | Frederiksen et al. .................... 361/119 |
| 5,575,689 | 11/1996 | Baggett et al. .......................... 361/119 |
| 5,643,014 | 7/1997 | Filus et al. ............................... 439/680 |

FOREIGN PATENT DOCUMENTS 2017428  3/1979  United Kingdom .

*Primary Examiner*—Fritz Fleming

[57] ABSTRACT

A modular connector block system used for making terminations of telephone circuit wires. The system enables terminal blocks of different size and density to be formed utilizing similar insulated housings and hardware. Connector modules having multiple pairs of insulation displacement connecting (IDC) terminals, for example, 8 or 10 pair per module, are insertable into a mounting bracket to form the double-sided connecting block. The 8 and 10-pair connector modules utilize an identical insulated housing to save on tooling costs. The same mounting hardware may also be utilized for either module. In addition, certain accessories, such as, circuit protection modules and terminal caps, used for enclosing the terminations, are likewise insertable onto either connector module. Each type of accessory shares an essentially identical housing, which further saves a manufacturer in terms of tooling costs and number of different components that must be produced.

26 Claims, 5 Drawing Sheets

COMMON INSULATING HOUSING FOR ELEMENTS OF VARYING TERMINALS

RELATED APPLICATIONS

The present patent application is related to U.S. patent application Ser. No. 08/442,898, entitled Mounting Of Protectors In Connector Blocks, having a filing date of May 17, 1995, now U.S. Pat. No. 5,643,014 that application having a common assignee and one or more common inventors and being incorporated herein by reference.

FIELD OF THE INVENTION

The present invention relates to connecting blocks for terminating telephone circuit wires, and more particularly to a modular connecting block system which utilizes a common housing for modules having different numbers of terminals.

BACKGROUND OF THE INVENTION

Individual pairs of telephone circuit wires are frequently terminated in telephone company central offices and customer premise locations utilizing multi-terminal connector blocks. Once terminated, these telephone circuit wires, usually comprised of narrow gauge insulated copper cables, are grouped and then rerouted for appropriate distribution of the calls which they carry. Single connector blocks normally accommodate anywhere from 60 to 100 pairs of densely packed terminations, wherein multiple connector blocks are frequently contained in close proximity at a single location, e.g., one wall of a telephone switching room. Efficient utilization of mounting space is thus required since space within utility locations is traditionally at a premium.

Connector blocks come in a variety of sizes in order to accommodate different numbers of terminations. Usually these connector blocks are of a standard width, wherein multiple pairs of terminals are included in a single row of the block. Common numbers of terminations per row may generally range between 8 and 10 pairs of terminals, for example. Depending on the application, a user may have the need for connector blocks having different densities of connections, i.e., using both 8 and 10 pairs of terminals in each row. In the past, such a change in connector block density would have required, on the user's end, purchase of at least two different sets of hardware to meet the requirements of each application. From the manufacturer's side, providing the user with terminal blocks of different density would normally require separate tooling and manufacturing processes in order to produce each size connector block. From either perspective, the ability to achieve certain degrees of flexibility in terms of a connecting scheme can be somewhat prohibitive.

It is therefore an object of the present invention to provide a modular connecting block system, wherein different sized connector blocks can utilize the same hardware. It is further an object of the present invention to enable connector blocks of different size and density to share common housings.

SUMMARY OF THE INVENTION

The present invention is a modular connector block system used for making terminations of telephone circuit wires. The system enables terminal blocks of different size and density to be formed utilizing similar insulated housings and hardware. Connector modules having multiple pairs of insulation displacement connecting (IDC) terminals, for example, 8 or 10 pair per module, are insertable into a mounting bracket to form the double-sided connecting block. The 8 and 10-pair connector modules utilize an identical insulated housing to save on tooling costs. The same mounting hardware may also be utilized for either module. In addition, certain accessories, such as, circuit protection modules and terminal caps, used for enclosing the terminations, are likewise insertable onto either connector module. Each type of accessory shares an essentially identical housing, which further saves a manufacturer in terms of tooling costs and number of different components that must be produced.

BRIEF DESCRIPTION OF THE FIGURES

For a better understanding of the present invention, reference may be had to the following description of exemplary embodiments thereof, considered in conjunction with the accompanying drawings, in which.

DETAILED DESCRIPTION OF THE DRAWINGS

Figure 1:
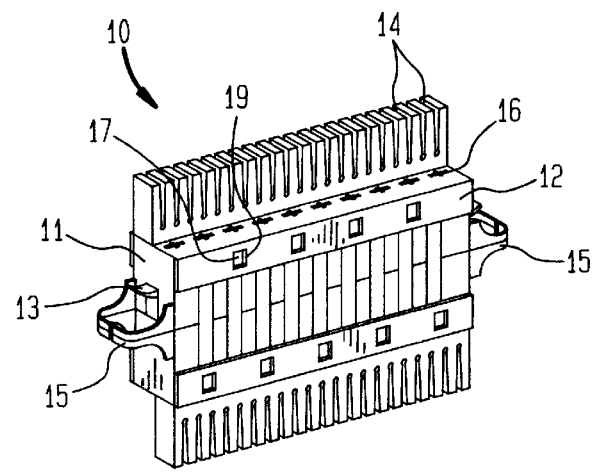
FIG. 1 shows a perspective view of one preferred embodiment of a 10-pair connector module having 10-pair terminal caps inserted thereon.

The present invention is a modular connecting block system which utilizes common housings to accommodate components having different numbers of terminals. Double-sided connecting blocks with differing numbers of terminal pairs are created utilizing, for example, 8 and 10-pair connector modules. Referring to FIG. 1, there is shown one preferred embodiment of a 10-pair connector module 10 having insulation displacement connector (IDC) terminals included therein. The connector module 10, as shown, includes an insulated housing 11 made, for example, of a plastic material. The housing includes a mounting latch 13 on either side thereof for securing the connector module 10 into a mounting bracket. The housing also includes fanning strips 15 located on either side of the housing 11 through which cables to be terminate within the connector module can be routed. Terminal caps 12 are shown mounted to the front and rear side of the connector module housing 11. The terminal caps 12 have slots 14 to allow for insertion of pairs of wires into the IDC terminals of the connector module. In this case, the terminal caps 12 attached to the 10-pair connector module 10 include 20 slots, each of which corresponds to a separate terminal of the module. The terminals are recessed within the terminal cap 12 thereby protecting the terminations from handling. The terminal cap 12 mounts to the connector module housing 11 in a mating arrangement between tabs 17 on the housing and cuts 19 on the cap 12. The connector module 10 and terminal cap 12 also include receptacle slots 16 for receiving current and voltage limiting circuit protection modules. These circuit protection modules utilize, for example, gas tubes, positive temperature coefficient (PTC) devices and other like elements to provide circuit protection from electrical surges which can be prevalent on telephone communications wires.

Figure 2:
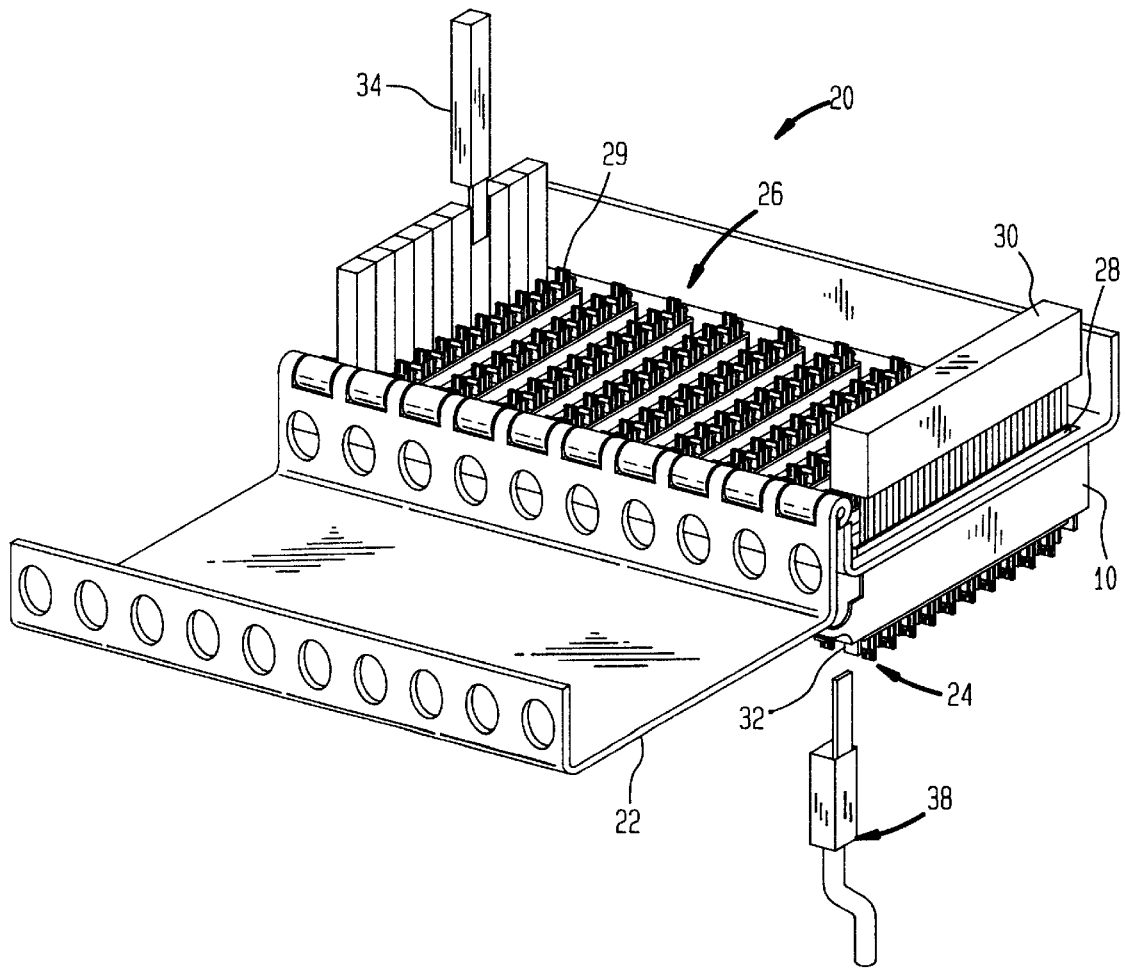
FIG. 2 shows a rear perspective view of one preferred embodiment of a connector block and hinged bracket using the connector modules of FIG. 1.

Referring to FIG. 2, there is shown one preferred embodiment of a connecting block 20 which is formed using the connector modules 10 of FIG. 1. The connector modules 10 are insertable into a hinged mounting bracket 22 which is adapted to receive the modules. The mounting bracket 22 is hinged in order to provide easy access to front and rear terminals 24, 26, respectively, of the connecting block 20 when the bracket is mounted. Circuit protection modules are shown inserted into connector modules 10 mounted in a first receptacle slot 28 and last receptacle slot 29 of the bracket. The first slot 28 illustrates insertion of a 10-pair cartridge protector module 30 which acts to provide current and voltage limiting circuit protection for all 10 pair of terminals included on the associated connector module 10. The cartridge protector module couples to support posts 32 of the mounting bracket to provide a low resistance discharge path in the event of an electrical surge. The last slot 29 of the mounting bracket 22 is shown including a connector module having a plurality of individual circuit protector modules 34 installed. The individual circuit protectors 34 provide current and voltage limiting circuit protection to individual pairs of terminals included on a connector module 10. The individual circuit protection modules connect to a ground bar (not shown) which in turn couples to the mounting bracket to provide a discharge path. The circuit protection modules, both individual and cartridge type, may be installed into the front or rear of the connector modules of a connecting block. A test plug 38 may also be inserted in the front or rear of each of the connector modules in the same receptacle slots 16 as the circuit protectors. The test plug 38 allows for testing and monitoring of circuits which are terminated at the connecting block 20 without having to disturb any of the terminations. The cartridge protection modules 30 are also mountable to the front or rear of a connecting block because of their internal grounding arrangement which couples to the mounting bracket.

Figure 3:
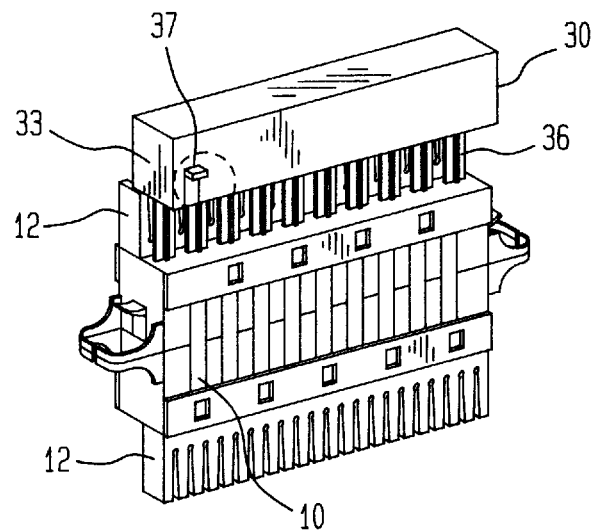
FIG. 3 shows a perspective view of a 10-pair connector module including 10-pair terminal caps and a 10-pair protector cartridge.

Referring to FIG. 3, there is shown one preferred embodiment of a 10-pair connector module 10 having a 10-pair protector cartridge 30 inserted into the front receptacle slots 16 thereof. The protector cartridge includes contacts 36 which extend into the base of the connector module housing. Each of the contacts 36 corresponds and couples to an individual front and back terminal 24, 26 housed in the connector module. As can be seen, the cartridge protector 30 of FIG. 3 includes 20 contacts for coupling with the 20 individual terminals on either side of the connector module 10. Individual gas tubes 37 or other like protection mechanisms contained within the cartridge housing 33 are coupled to individual pairs of contacts on the protection cartridge 30. As can be seen the housing 33 of the protector cartridge 30 spans the entire length of the connector module 10. Accordingly, each pair of contacts on the protection cartridge 30 and each pair of terminals on the connector module 10 are protected by an individual protection mechanism. The connector module 10, as shown, also includes 10-pair terminal caps 12 mounted on the front and rear sides thereof The terminal caps protect the terminals and terminations from the adverse effects of handling.

Figure 4:
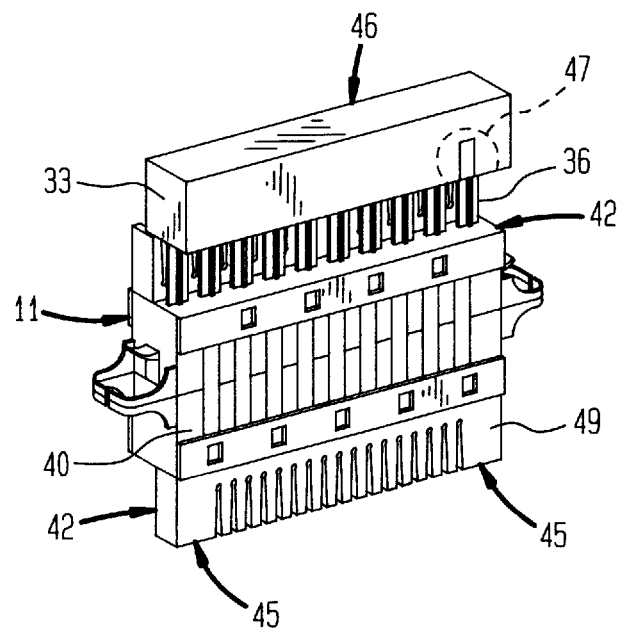
FIG. 4 shows a perspective view of an 8-pair connector module including 8-pair terminal caps and an 8-pair protector cartridge.

Referring to FIG. 4, there is shown one preferred embodiment of an 8-pair connector module 40. The 8-pair connector module includes eight pairs of IDC terminals within its housing. The 8-pair connector utilizes the identical housing 11 which was utilized to house the 10-pair connector module 10. The only difference between the 8-pair connector module 40 and the 10-pair connector module 10 is that the end pairs of terminals are not installed in either side of the 8-pair housing, thereby leaving only 8 pairs of terminals 24, 26 on either side of the connector module 40. 8-pair terminal caps 42 are installed on either side of the 8-pair connector module 40. As can be seen the 8-pair terminal cap 42 includes 16 slots which correspond to each of the 16 terminals on one side of the connector module. Blank spaces, i.e., no slots, are included at the end portions 45 of the terminal cap 42 where no contacts would be found on the connector module 40. With the exception of the two fewer slots at either end of the terminal caps 42, the 8-pair terminal cap 42 and the 10 pair terminal cap 12 are identical. Depending on the manufacturing process for the terminal caps, i.e., whether the slots are cut into the terminal caps as a separate operation or included as an element within a plastic mold, the exact same tooling and/or molds may be utilized to produce the 8-pair terminal cap 42 and the 10-pair terminal cap 12. The same holds true for production of the 8-pair and 10-pair connector modules 40, 10, respectively, since the housings for each part are identical.

The 8-pair connector module is also shown with an 8-pair protector cartridge 46 installed on the front side of the connector module 40. The 8-pair protector cartridge uses the identical housing 33 of the 10-pair protector cartridge 30. The 8-pair protection cartridge 46 includes 20 contacts extending into the base of the connector module housing 11, as with the 10 pair cartridge 30. Thus, the 8-pair protector cartridge 46 and the 10-pair protection cartridge 30 are identical with the exception that circuit protection mechanisms, for example, gas tubes 37, are not included in the two end locations 47 of the 8-pair cartridge 46. The two end locations can be left blank or may be used to store spare gas tubes. Since the 8 and 10-pair cartridges 46, 30 are in all but one respect identical, the same housings and production methods can be used to manufacture both parts. As with the connector module housings 11 and the terminal caps 12, 42, by utilizing identical housings to accommodate components with varying numbers of terminals, tooling costs, labor costs and inventory costs are significantly reduced, thereby making the parts less expensive to manufacture and more attractive to the consumer. Also the fact that the 8 and 10-pair connector modules 40, 10 are interchangeable into the same mounting bracket 22 gives the system added flexibility which is also attractive from a consumer's point of view.

Figure 5:
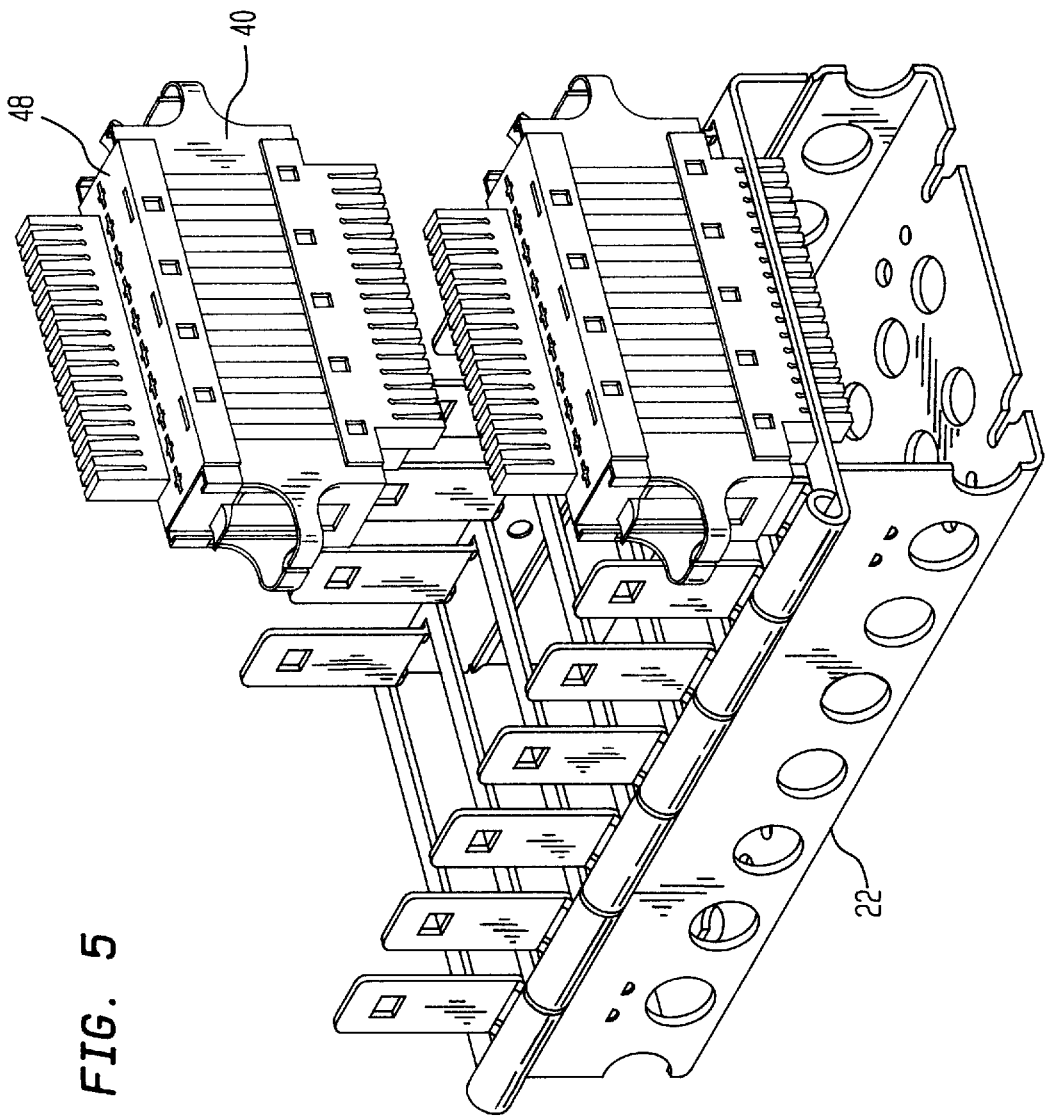
FIG. 5 shows 8-pair connector modules being inserted into a mounting bracket, wherein the connector modules include a second preferred embodiment of 8-pair terminal caps.

Referring to FIG. 5, there is shown an alternate embodiment of two 8-pair connector modules 40, wherein one module is installed within the mounting bracket 22. Each of the connector modules includes terminal caps 48 installed on the front and rear sides thereof. The terminal caps 48 shown in FIG. 5 are slightly different than the terminal caps 42 of FIG. 4, in that the end tower sections 49 (shown in FIG. 4) which do not correspond to any terminals are left off of the terminal cap 48. In the previous embodiment of the terminal cap 42 shown in FIG. 4, these tower sections 49 were left intact although they did not contain slots. Even though the tower sections 49 of the terminal cap 48 are removed, as shown in FIG. 5, similar tooling may still be used for manufacture of the shown 8-pair and 10-pair terminal caps 48, 12.

Figure 5A:
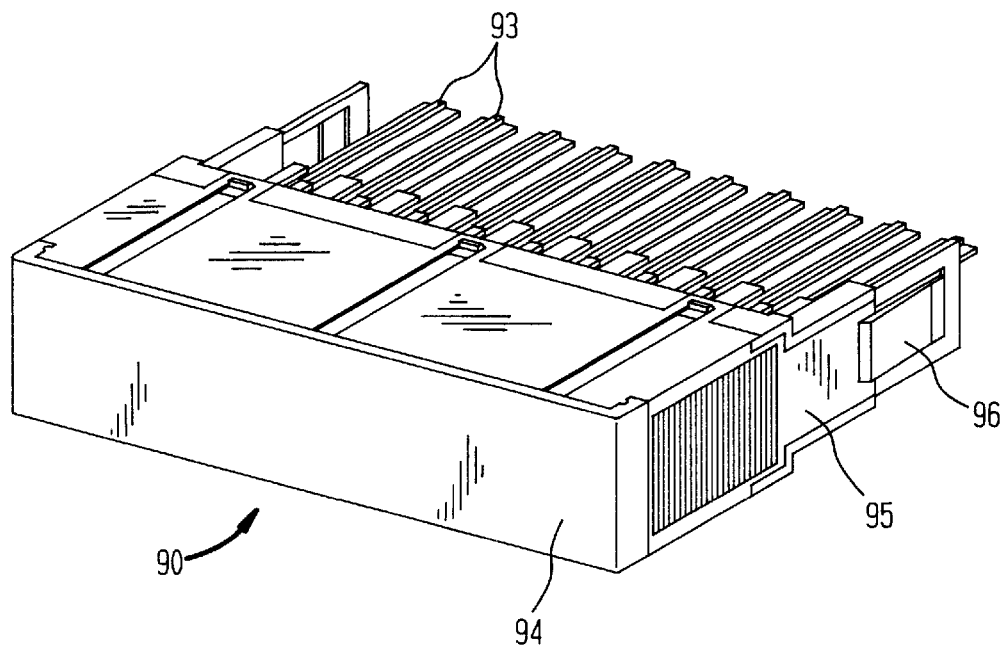
FIG. 5A shows a second preferred embodiment of a 10-pair protector module.
Figure 5B:
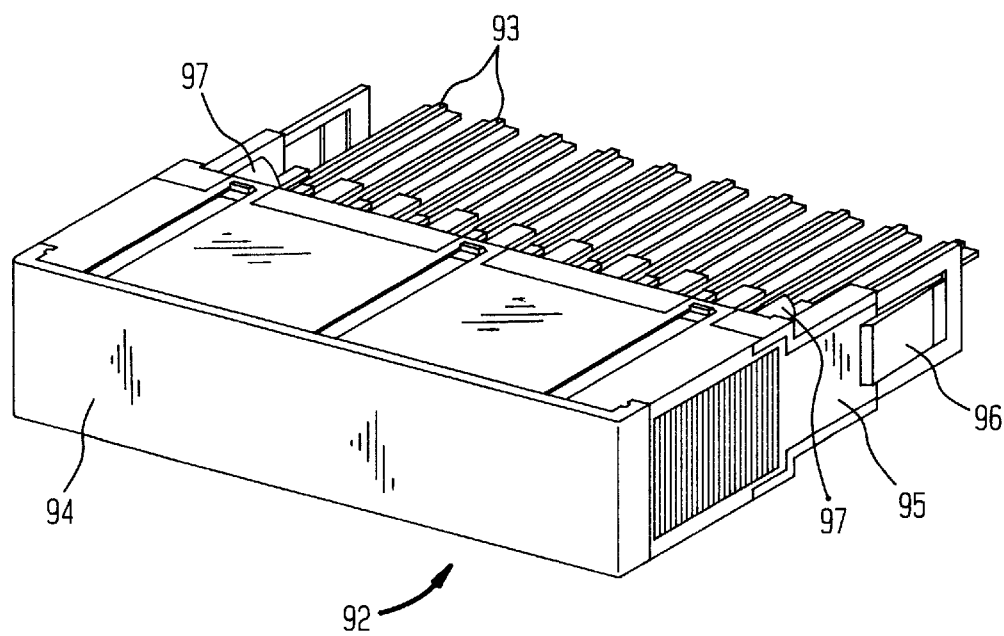
FIG. 5B shows a second preferred embodiment of an 8-pair protector module.

Referring to FIG. 5A and 5B, there is shown a second preferred embodiment of a 10-pair protector module 90 and an 8- pair protection module 92, respectively. The protection modules 90, 92 are intended to be used with connector modules 10, 40 using the terminal caps 12, 48 shown in FIGS. 1 and 5. The protection modules 90, 92 are similar to those modules 30, 46 described with respect to FIGS. 3 and 4 in that the modules 90, 92 include contacts 93 and share a common housing 94. Both protection modules 90, 92 also include an insertion arm 95 and insertion tab 96 for coupling with the connector module and/or mounting bracket. The 10-pair protection module 90 may be used with 8 and 10 pair connector modules 10, 40 (and terminal caps), since protection from the 10-pair protection cartridges 90 will cover all the terminals of a connector module. The 8-pair connector module 92, however, includes an exclusion feature, comprised of exclusion posts 97 mounted adjacent the insertion arm 95, that enables the 8-pair protector cartridge 92 to be used only with 8-pair connector modules 40 using the 8-pair terminal cap 48 of FIG. 5. As can be seen, the 8-pair protector cartridge 92 is insertable into an 8-pair connector module 40 with a terminal cap 48 having the towers removed, this is because the blank area with the towers removed will not obstruct the insertion. If, however, an eight pair-protector cartridge 92 is attempted to be inserted into a 10-pair connector module 10 with a 10-pair terminal cap 12, the end towers will block the insertion of the 8-pair module 92. This feature is advantageous, since terminals cannot inadvertently be left unprotected by insertion of a wrong-size protector cartridge.

Figure 6A:
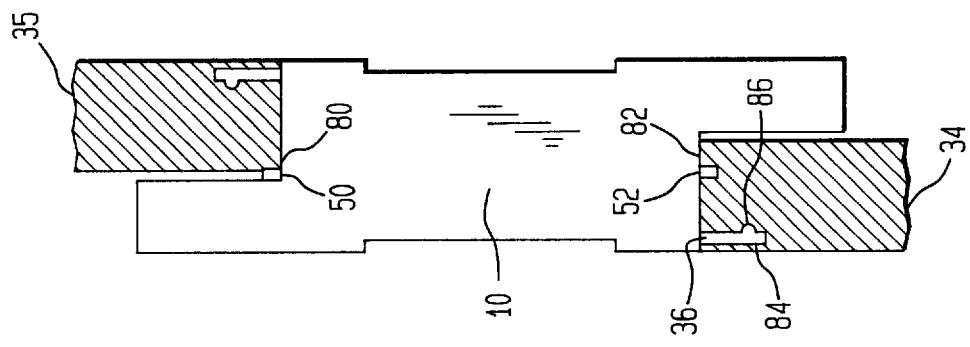
FIG. 6A shows a side cross sectional view of a connector module which illustrates the internal geometry of connector module and terminals.

Referring to FIG. 6A, there is shown a side cross-section of one preferred embodiment of a connector module 10 which utilizes the common housing 11. The connector module is shown with terminal caps 12 installed on the front and rear side terminals 24, 26. A ground bar 36 is shown as it would be oriented in a rear installation into the mounting bracket 22. A rear exclusion post 50, which is part of a circuit protection interface arrangement, is shown mounted proximate the ground bar 36 in an interior region in the rear of the connector module 10. A front exclusion post 52 is shown mounted on the front of the connector module 10, wherein the front post 52 is located at a different orientation closer to the terminal 24 and proximate the receptacle slot 16. The front and rear exclusion posts 50, 52 are located at different positions relative one another on the connector module 10. Extension members 54, 56 are also shown coupled to each of the front and rear terminals 24, 26, respectively. The extension members 54, 56 bias against one another to from a normally closed contact.

FIG. 6A also illustrates the geometry of the terminals 24, 26 which are used to make terminations on the connecting block. These terminals 24, 26 are insulation displacement connector-type (IDC) terminals which automatically cut and displace the insulation of a wire in order to make connection with the metallic conductor contained inside the insulation. The IDC terminal 24 is a unitary connecting element having two arms 58, 59 and a slot 60 centrally disposed therein. The base of the terminal 24 couples to the extension member 54 which continues into an interior portion of the associated connector module 10. The two arms 58, 59 of the terminal 24 which define the slot 60 are shaped so as to define a widened slot proximate a top edge of the terminal, hereinafter referred to as the retaining region 62. A second widened slot is located toward the base of the module 10 and, as will be understood, this second widened slot is referred to as the removal aperture 64. The retaining region 62 of the terminal 24 is advantageous in that, when desired, individual conductors may be held within the retaining region 62 of the terminal 24 prior to insertion. Accordingly, all conductors may be dressed into the terminals 24 of a connector module as one operation and then seated into the IDC terminals as a second operation. The terminals of the connector module 10 are adapted to receive conductor wires of various sizes, e.g., 22–26 AWG, of both a solid and stranded variety. The width of the slot in the retaining region 62 is gradually tapered to widths that are slightly less than the outer diameter of wires to be inserted therein. Also the two arms 58, 59 of the terminal 24 are essentially formed as a spring contact. Thus, varying gauges of wire are held securely in the retaining region 62 prior to termination.

The IDC terminal 24 is adapted to terminate a wire which is inserted into the slotted IDC portion 66 of the terminal. As will be understood the distance between the arms 58, 59 in the IDC portion 66 of the terminal 24 is less than the minimum diameter of a conductor to be inserted. Inside facing edges of the terminal arms 58, 59 facing the slot 60 terminate with sharpened edges in order that the protective insulation of a conductor inserted at the IDC portion 66 of the terminal will have the insulation cut and/or displaced by the sharpened edges. The conductor contained within the insulated wire will make physical contact with the arms 58, 59 of the terminal 24, thereby producing an electrical connection between the conductor and the terminal 24. It will be noted that each of the arms of the terminal 24 separately cuts into the insulation of the wire to ensure a gas tight connection.

The removal aperture 64 located at the base region of the terminal 24 is considerably wider than the terminal slot 60 at the IDC region 66. The removal aperture 64 is generally elliptical and is also somewhat wider at its middle region than the outermost diameter of any conductor wire specified for insertion into the terminal 24. Since the aperture 64 is wider than the diameter of an inserted conductor wire, a first conductor inserted within the terminal may be slid down through the IDC area 66 into the removal aperture 64 and removed. Removal of a first of two conductors from the IDC terminal 24 is thus accomplished without disturbing or jeopardizing the integrity of the second connection. The removal aperture also enables somewhat less torsional retaining force to be exerted on the arms 58, 59 of the IDC portion 66 of the terminal 24 from the solid base region of the terminal 24 when certain size wires are inserted. This allows the arms 25, 26 of the terminal to more freely twist under certain circumstances producing an elastic buckling effect. This elastic buckling effect allows larger and/or more than one conductor to be inserted into the terminal 24 without permanently yielding the arms 58, 59 or beams of the terminal, since the large flat contacts of the IDC portion 66 of the terminal 24 displace torsionally when normal forces exceed a fixed load. This helps preserve the original structure of the terminal 24 and increase its usable life for subsequent insertions.

Figure 6B:
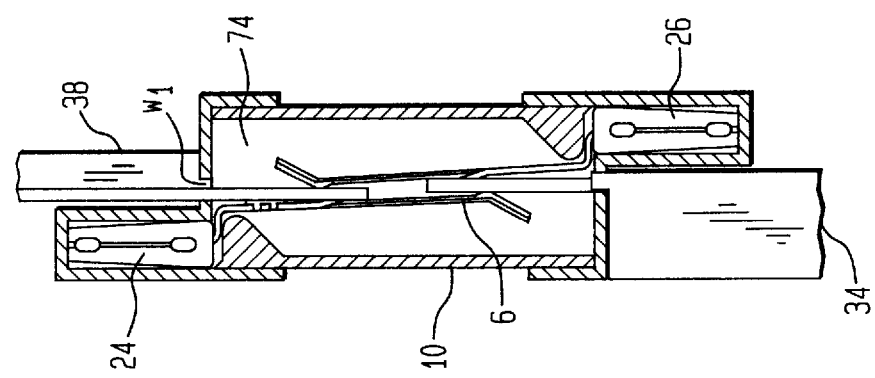
FIG. 6B shows a side cross sectional view of the connector module having a circuit protection module installed within a rear side receptacle.

Referring to FIG. 6B, the connector module 10 is shown with a single terminal pair protector unit 34 installed into a rear receptacle slot. The single unit protector 34 is inserted within the rear of the connector module 10, wherein a contact element 70 from the protector makes contact with both the front and rear terminals 24, 26 of the connector module. Front 71 and rear sides 73 of the contact element 70 which couple to the respective terminals 24, 26 of the connector module 10 are insulated from one another, thus, current is forced to flow within the protector module 34. A protection circuit (not shown) is included in a cap region 75 of the protector module 34 to provide voltage and current limiting protection. FIG. 6B illustrates the direction of current flow from an incoming circuit which is terminated at the rear terminal 26 of the connector module. As can be seen the protector module 34 is inserted in series between the front and rear terminals 24, 26 and current is forced to flow through the circuit of the protection module. Insertion of the protector 34 thus causes a separation between the front and back terminals 24, 26 of the connector module 10 so that current is flows through the protector 34.

Figure 6C:
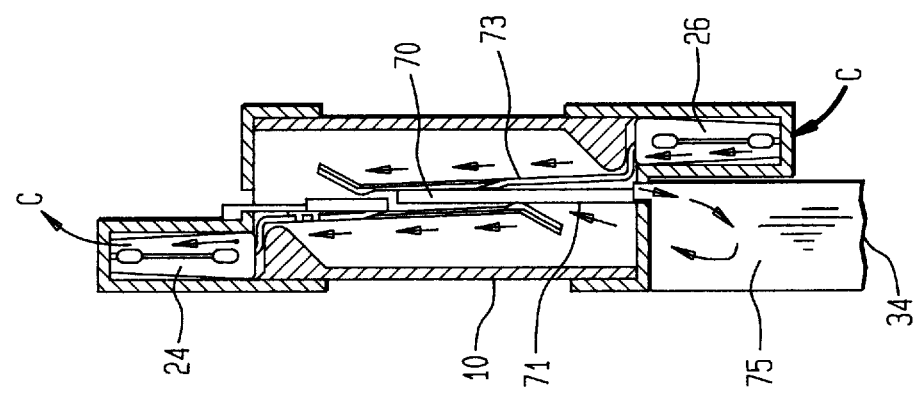
FIG. 6C shows a cross sectional view of a connector module having both a circuit protection module and a test plug installed therein.

Referring to FIG. 6C, a connector module 10 is shown having an individual protector 34 installed in the rear of the module and a test plug 38 installed in the front side of the module 10. A tab 74 is included on a stem portion 91 of the test plug 38 having sufficient width W1, to bias apart the extension members 54, 56 of the terminals 24, 26 when the test plug is inserted. A gap G of predetermined width is created between the front facing terminal 24 of the connector module and the conductive bar 70 of the individual protector module 34 when the test plug 38 is inserted. The rear side terminal 26 (or cable termination side) remains coupled to the protector unit 34 to provide voltage only protection. The test plug 38, in a similar fashion to the circuit protection modules 34, 30, is inserted in series between the front and rear terminals 24, 26 of a connector pair. The test plug 38 and its associated circuitry will be adapted to test both in and out of circuit, i.e., provide test access to terminated cables inside the plant or outside cables terminated at the rear of a connector block. The test plug 38 may also provide the capability to establish a through connection between front and rear terminations to allow for monitoring. The above demonstrates the ability to test bi-directionally utilizing the test plug feature, while at the same time maintaining circuit protection on the rear or cable termination side of the connector block.

Figure 6D:
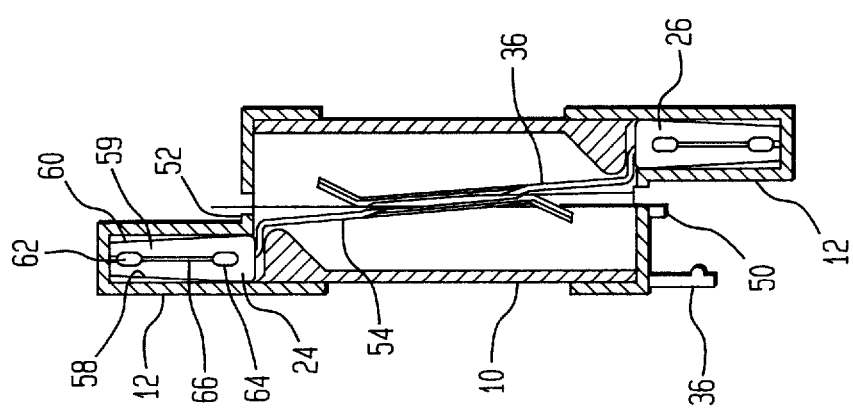
FIG. 6D shows a cross section of the connector module with a circuit protection modules coupled to front and rear side locations to illustrate an exclusionary interface.

Referring to FIG. 6D, an exclusionary mounting arrangement is illustrated as protection modules 34, 35 are shown inserted into the front and rear of a connector module 10. The exclusionary interface is utilized to ensure proper polarity insertion of the protection modules 34, 35 into the front and rear of the connector module 10. The interface is comprised of a key and slot system which prohibits insertion of a protection module with improper polarity. A rectangular protrusion of the rear exclusion post 52 forms a key within the central interior section on the rear of the connector module 10. A corresponding cavity 82 or slot on a rear mountable protection module 34 aligns with the rear exclusion post 52 and allows the protection module 34 to be fully inserted within the connector module 10. The front rectangular exclusion post 50 is disposed proximate the front receptacle slot 16 and forms the front key. A corresponding cavity 80 on a front mountable protection module 35 mates with the front exclusion post 50 to enable a full insertion into the receptacle slot 16. Thus, the orientation of the exclusion posts 50, 52 on the front and rear of the connector module precludes front-only protection modules 35 being inserted into the rear of a connector module and, vice-versa, a rear-only protection module 34 cannot be inserted into the front of a connector module 10. Accordingly, the present invention interface excludes insertion of current and voltage limiting protection modules with improper polarity.

There are cases, however, where protection modules are not polarity specific, as in the case of voltage only protection modules which are not required to make a series connection. Since voltage-only protection modules are not polarity specific, they may be inserted into the front or rear of a connector module 10, where these protection modules perform equally well in either location. Voltage-only protection modules can thus be outfitted with dual cavities which align and mate with exclusion posts 50, 52 on both the front and rear of a connector module. This enables the voltage-only protection modules to be inserted on either side of the connector module 10 for increased flexibility and cost savings to the user. Although the present invention exclusionary interface is shown using rectangular exclusion keys and cavities, it will be understood that other types of protrusions and associated slots along with other orientations therefor may also be utilized. In addition, it twill be understood that keys may be included in the circuit protection rather than the connector module housing and that the shown embodiments are merely illustrative of the present invention interface.

FIG. 6D also shows that the individual protector 34 includes a cavity 84 which is adapted to receive and mate with the ground bar 31 that couples to the mounting bracket 54 to thereby establish an electrical discharge path for the protector. The ground bar 31 as shown is designed to fit over the connector module 10 and a positive seat 86 on the ground bar will indicate when an individual protector 34 is fully inserted. Individual protectors 34, 35 and corresponding ground bars 31 are shown installed in both the front and rear of the connector module 10. This is done for illustration purposes to show the flexibility of the connector module system. Practical applications would normally require only that protection to be installed at one of these locations.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

What is claimed is:

1. A mountable apparatus for use in a modular connecting block system, wherein connector modules having connecting terminals on front and rear sides thereof are insertable into a mounting bracket to form a double-sided connecting block, and wherein said connector modules are adapted to house different numbers of said connecting terminals, said apparatus comprising:

a connector module housing for housing said connecting terminals, said housing being adapted to accept varying numbers of said connecting terminals to thereby form different sized ones of said connector modules, wherein a connecting block having selectively varying numbers of said connecting terminals may be assembled utilizing said connector module housing wherein said connector modules having different predetermined numbers of said connecting terminals included therein utilize said same connector module housing, wherein said connector module housing is adapted to accept circuit protection devices on either of said front and rear sides for providing current and voltage limiting circuit protection to said connecting terminals, said connector module including a plurality of receptacles corresponding to pairs of said connecting terminals for receiving a circuit protection device, and said apparatus further including an insertable circuit protection cartridge comprising, a plurality of contacts extending from said protection cartridge, each of said plurality of contacts corresponding to an individual one of said connecting terminals on said connector module, said contacts being adapted for insertion into said receptacles of said connector module to thereby couple to respective ones of said connecting terminals, circuit protection means coupled between pairs of said contacts for providing said current and voltage limiting circuit protection, and a common insulated cartridge housing for housing said circuit protection means, said cartridge housing adapted to accept variable numbers of said circuit protection means corresponding to pairs of said predetermined number of connecting terminals, said cartridge housing being usable with all said different sized ones of said connector modules, wherein said protection cartridge adapted for use with a connector module having less than said predetermined maximum number of terminals further includes exclusion means coupled to ends of said cartridge housing, said exclusion means extending vertically downward from said cartridge housing adjacent said contacts located at said ends of said cartridge housing, said exclusion means aligning with an unoccupied region of a terminal cap for less than said predetermined maximum number of terminals, a tower region of a terminal cap adapted for use with said connector modules having said predetermined maximum number of terminals extending along a mountable platform beyond a tower region for said terminal cap for less than said predetermined maximum number of terminals, wherein said protector cartridge having said exclusion means is prevented from insertion into said connector modules having said predetermined maximum number of terminals, said protector cartridge being excluded by said tower region of said terminal cap.

2. The apparatus of claim 1, wherein said connecting block system utilizes terminal caps to enclose and protect said connecting terminals when said connector module housing is installed within a connecting block, wherein said apparatus further includes a common terminal cap housing mountable to said connector module housing, said common terminal cap housing including, a mountable platform for securing to said connector module housing, and a vertically extending tower region extending the length of said platform and defining a hollow therein for enclosing said connecting terminals, said tower region includable with predetermined different numbers of access slots for enabling access to said terminals, wherein said predetermined different numbers of slots correspond to said predetermined number of terminals on said connector modules, said connector modules all utilizing said common terminal cap housing.

3. The apparatus of claim 2, wherein said connector module and said terminal cap collectively include a tab and slot latching means for securably fastening said terminal cap to said connector module housing.

4. The apparatus of claim 1, wherein said connecting block system utilizes terminal caps to enclose and protect said connecting terminals, and wherein said connector modules can include up to a predetermined maximum number of connecting terminals, said apparatus including a terminal cap housing mountable to said connector module housing, said common terminal cap housing including, a mountable platform for securing to said connector module housing, said platform having a length corresponding to a length of said connector module housing, and a vertically extending tower region defining a hollow therein for enclosing said connecting terminals, said tower region includable with a predetermined number of access slots for enabling access to said terminals, wherein said predetermined number of slots corresponds to said predetermined number of terminals on said connector modules, and wherein said tower region of a terminal cap having said predetermined number of access slots which is less than said predetermined maximum number of connecting terminals extends only a partial length of said platform, thereby leaving unoccupied areas at opposite ends of said length of said platform.

5. The apparatus of claim 4, wherein said predetermined maximum number of terminals is 20, thereby corresponding to 10 pairs of terminals.

6. The apparatus of claim 1, wherein said connector module housing includes latching means on either side thereof for securably fastening to support posts of said mounting bracket.

7. The apparatus of claim 1, wherein said connector module housing further includes fanning strips coupled to either side of said housing for routing of cables to be terminated at said connector module.

8. The apparatus of claim 1, wherein said connector module further includes conductive contact members extending from each of said connecting terminals within said connector module housing, wherein said contact members from corresponding connecting terminals on said front and rear sides of said connector module bias against one another to form a normally closed contact.

9. The apparatus of claim 8, wherein contacts of current and voltage limiting protection cartridges are inserted between said contact elements corresponding to said front and rear terminals of said connector module.

10. The apparatus of claim 8, wherein said connector modules are further adapted to receive a test plug between said contact elements, said test plug adapted to selectively couple to said front and rear terminals of said connector module.

11. The apparatus of claim 1, wherein said circuit protection cartridges are polarity sensitive, and wherein a circuit protection cartridge mountable at a front side of a connector module is not interchangeable with a circuit protection device mountable at a rear side of said connector module, said apparatus including a polarity checking feature comprising:

first vertically protruding key disposed on said front side of said connector module housing; and second vertically protruding key disposed on said rear side of said connector module housing, said second key being disposed at an alternate location relative said first key with respect to said insertable protection devices, wherein said first key mates with a corresponding firs slot on a front-only mountable protection device and said second key mates with a corresponding second slot on a rear-only mountable protection device, whereby said front-only mountable protection device is excluded from insertion into said rear side of said connector module and said rear-only mountable protection device is excluded from insertion into said front side of said connector module.

12. The apparatus of claim 1, wherein said connecting terminals are insulation displacement connectors comprising:
   an essentially U-shaped terminal element of a resilient conductive material, said terminal element including a base region;
   first and second side members extending from said base region, said side members defining a centralized first slot in said terminal, said first slot being open at a top region thereof and having a predetermined width less than said metallic conductor, wherein said side members include sharpened inside edges adapted to cut through said insulated jacket of said conductor to thereby establish an electrical connection, said side members being operable to draw together in a spring-like manner when separated at a width greater than said predetermined width of said slot; and
   wherein said members further include retaining means proximate said top region of said terminal element adjoining said first slot, said retaining means adapted for retaining said insulated wire prior to insertion in said first slot.

13. The apparatus of claim 10, wherein said arm sections further define an opening in said base region of said terminal element adjoining said slot, said opening having a width greater than said width of said slot, wherein said opening adjoining said slot enables said sharpened edges of said arm sections to torsionally deflect upon a predetermined normal force being exerted by insertion of said wire into said slot.

14. The apparatus of claim 1, wherein said connector module further includes conductive contact members extending from each of said connecting terminals within said connector module housing, wherein said contact members from corresponding connecting terminals on said front and rear sides of said connector module bias against one another to form a normally closed contact, wherein said normally closed contacts are separated upon insertion of said protection cartridge, corresponding contacts of said protection cartridge being placed in series between said contact members.

15. A modular connecting block system used for terminating a plurality of wires, wherein connector modules having connecting terminals on front and rear sides thereof are insertable into a mounting bracket to form a double-sided connecting block, and wherein said modular connecting block system utilizes common insulated housings to accommodate components having varying numbers of terminals, said system comprising:
   a connector module for inclusion of said connecting terminals, said connector module including,
   a common insulated connector module housing for housing a predetermined number of said connecting terminals on a front and rear side thereof, said terminals being disposed in a single row, wherein said connector module housing is insertable into a hinged mounting bracket, and
   a plurality of said connecting terminals disposed on said front and rear sides of said connector module housing, wherein a corresponding front and rear terminal of said connector module are coupled together within said housing by means of a separable normally closed contact, wherein said connector module housing is usable for a variable number of said terminals to be included within said connector module.

16. The system of claim 15, wherein said connector module housing is adapted to accept circuit protection devices on either of said front and rear sides for providing current and voltage limiting circuit protection to said connecting terminals, said connector module including a plurality of receptacles corresponding to pairs of said connecting terminals for receiving a circuit protection device, and said apparatus further including an insertable circuit protection cartridge comprising,
   a plurality of contacts extending from said protection cartridge, each of said plurality of contacts corresponding to an individual one of said connecting terminals on said connector module, said contacts being adapted for insertion into said receptacles of said connector module to thereby couple to respective ones of said connecting terminals, wherein said insertion couples said contacts between said normally closed contact,
   circuit protection means coupled between pairs of said contacts for providing said current and voltage limiting circuit protection, and
   a common insulated cartridge housing for housing said circuit protection means, said cartridge housing adapted to accept variable numbers of said circuit protection means corresponding to pairs of said variable number of connecting terminals, said cartridge housing being adapted for use with any said connector module with varying numbers of terminals.

17. The system of claim 16, wherein a first and second side of each of said contacts of said protection cartridge are insulated from one another, such that said circuit protection means is placed in series between said corresponding front and rear terminal of said connector module during said insertion.

18. The system of claim 15, further including a removable terminal cap securably fastenable to said connector module housing for covering said connecting terminals, said terminal cap including a common insulated cap housing and a variable number of terminal slots for aligning with said variable number of connecting terminals to thereby enable insertion of a wire into said connecting terminals.

19. The system of claim 15, further including a hinged mounting bracket adapted for insertion of said connector modules to thereby create said modular connecting block.

20. The system of claim 15, including a first type of said connector module having 10 pairs of said connector terminals on said front and rear side thereof and a second type of connector module having 8 pairs of connector terminals on said front and rear side.

21. In a modular connecting block system, wherein connector modules having connecting terminals on front and rear sides thereof are insertable into a mounting bracket to form a connecting block, and wherein said connector modules are adapted to receive polarity sensitive insertable current and voltage limiting circuit protection devices on said front and rear sides of said connector modules for protecting individual pairs of said terminals, a protector module device comprising:
   a protector housing for containing voltage and current limiting protection means;
   at least one conductive contact insertable within a housing of said connector module to thereby couple with said connecting terminals, said contact extending from said protector housing and coupled to said protection means, wherein said protector module device is insertable in either said front or rear sides of said connector module, wherein said protector housing includes exclusion means, a first polarity protection device is excluded from insertion into said front side of said connector module and a second polarity device is excluded from insertion into said rear side of said connector module, and wherein said protector module device is a single protector unit adapted to protect single pairs of terminals on said front and rear sides of said connector module.

22. In a modular connecting block system, wherein connector modules having connecting terminals on front and rear sides thereof are insertable into a mounting bracket to form a connecting block, and wherein said connector modules are adapted to receive polarity sensitive insertable current and voltage limiting circuit protection devices on said front and rear sides of said connector modules for protecting individual pairs of said terminals, a protector module device comprising:

a protector housing for containing voltage and current limiting protection means;

at least one conductive contact insertable within a housing of said connector module to thereby couple with said connecting terminals, said contact extending from said protector housing and coupled to said protection means, wherein said protector module device is insertable in either said front or rear sides of said connector module, wherein said protector housing includes exclusion means, a first polarity protection device is excluded from insertion into said front side of said connector module and a second polarity device is excluded from insertion into said rear side of said connector module, and wherein said protector module device is a protector cartridge adapted to protect multiple pairs of terminals in said connector module, wherein said protector housing includes multiple protection means for protection of said multiple pairs of terminals.

23. The device of claim 22, wherein said protector module device includes an internal ground bus adapted to couple with said mounting bracket to thereby provide a discharge path to ground.

24. In a modular connecting block system, wherein connector modules having connecting terminals on front and rear sides thereof are insertable into a mounting bracket to form a connecting block, and wherein said connector modules are adapted to receive polarity sensitive insertable current and voltage limiting circuit protection devices on said front and rear sides of said connector modules for protecting individual pairs of said terminals, a protector module device comprising:

a protector housing for containing voltage and current limiting protection means;

at least one conductive contact insertable within a housing of said connector module to thereby couple with said connecting terminals, said contact extending from said protector housing and coupled to said protection means, wherein said protector module device is insertable in either said front or rear sides of said connector module, wherein said protector housing includes exclusion means, a first polarity protection device is excluded from insertion into said front side of said connector module and a second polarity device is excluded from insertion into said rear side of said connector module, and wherein said protection means are selected from the group consisting of gas tube, carbon-type, PTC and solid state protection devices.

25. A protection cartridge apparatus for use in a modular connecting block system, wherein connector modules having connecting terminals on front and rear sides thereof are insertable into a mounting bracket to form a double-sided connecting block, said connector modules being adapted to house different numbers of said connecting terminals, wherein said connector modules are adapted to accept circuit protection devices on either of said front and rear sides for providing current and voltage limiting circuit protection to said connecting terminals, said connector module including a plurality of receptacles corresponding to pairs of said connecting terminals for receiving a circuit protection device, said circuit protection cartridge apparatus comprising:

a plurality of contacts extending from said protection cartridge, each of said plurality of contacts corresponding to an individual one of said connecting terminals on said connector module, said contacts being adapted for insertion into said receptacles of said connector module to thereby couple to respective ones of said connecting terminals, circuit protection means coupled between pairs of said contacts for providing said current and voltage limiting circuit protection, and a common insulated cartridge housing for housing said circuit protection means, said cartridge housing adapted to accept variable numbers of said circuit protection means corresponding to pairs of a predetermined number of connecting terminals, wherein said protection cartridge adapted for use with a connector module having less than a predetermined maximum number of terminals further includes exclusion means, wherein said protector cartridge having said exclusion means is prevented from insertion into said connector modules having said predetermined maximum number of terminals.

26. The apparatus of claim 25, wherein said exclusion means is coupled to ends of said protector cartridge housing, said exclusion means extending vertically downward from said cartridge housing adjacent said contacts located at said ends of said cartridge housing, said exclusion means aligning with an unoccupied region of a terminal cap for less than said predetermined maximum number of terminals, wherein a tower region of a terminal cap adapted for use with said connector modules having said predetermined maximum number of terminals extends along a mountable platform beyond a tower region for said terminal cap for less than said predetermined maximum number of terminals, said protector cartridge being excluded by said tower region of said terminal cap for said predetermined maximum number of terminals.

* * * * *